United States Patent
Shimizu et al.

(10) Patent No.: US 9,520,585 B2
(45) Date of Patent: Dec. 13, 2016

(54) ASSEMBLED BATTERY AND CELL CONNECTION METHOD

(75) Inventors: Toshiya Shimizu, Mizuho (JP); Kiyoshi Shibata, Gifu (JP); Yasuhiro Kohara, Suita (JP); Yasuhiro Asai, Kasai (JP); Takashi Seto, Kakogawa (JP); Daiki Uchiyama, Kasai (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 427 days.

(21) Appl. No.: 14/003,492

(22) PCT Filed: Feb. 27, 2012

(86) PCT No.: PCT/JP2012/001317
§ 371 (c)(1),
(2), (4) Date: Nov. 13, 2013

(87) PCT Pub. No.: WO2012/120821
PCT Pub. Date: Sep. 13, 2012

(65) Prior Publication Data
US 2014/0057157 A1    Feb. 27, 2014

(30) Foreign Application Priority Data
Mar. 10, 2011 (JP) .................. 2011-053634

(51) Int. Cl.
*H01M 2/20* (2006.01)
*H01M 2/10* (2006.01)
*H01M 2/30* (2006.01)

(52) U.S. Cl.
CPC ........... *H01M 2/204* (2013.01); *H01M 2/1016* (2013.01); *H01M 2/202* (2013.01);
(Continued)

(58) Field of Classification Search
None
See application file for complete search history.

(56) References Cited

U.S. PATENT DOCUMENTS 6,379,837 B1 * 4/2002 Takahashi ............... H01M 2/08
429/120
7,858,221 B2   12/2010 Sato
(Continued)

FOREIGN PATENT DOCUMENTS

JP    2004-253311 A    9/2004
JP    2008-311014 A    12/2008
(Continued)

OTHER PUBLICATIONS

International Search Report issued in PCT/JP2012/001317 dated May 22, 2013 with English Translation.

*Primary Examiner* — Carlos Barcena
*Assistant Examiner* — Wojciech Haske
(74) *Attorney, Agent, or Firm* — McDermott Will & Emery LLP

(57) ABSTRACT

An assembled battery comprises: multiple cells 30 each having external terminals including a negative electrode terminal 50 and a positive electrode terminal; a bus bar 40 which connects the external terminal of one of two adjacent cells 30 and that of the other thereof; an electrically-conductive connecting member 70 which connects the external terminal and the bus bar 40 by welding to the external terminal and the bus bar 40; a welding portion 80 welded to the bus bar 40 and the connecting member 70; and a welding portion 82 welded to the external terminal and the connecting member 70. The connecting member 70 comprises an intervening portion 70b connected to the welding portion 80, and a main body portion 70a extending from the intervening portion 70b to the welding portion 82. The intervening
(Continued)

portion 70*b* has a thickness that is smaller than that of the main body portion 70*a*.

7 Claims, 11 Drawing Sheets

(52) U.S. Cl.
CPC ............ *H01M 2/206* (2013.01); *H01M 2/30* (2013.01); *Y10T 29/49108* (2015.01)

(56) References Cited

U.S. PATENT DOCUMENTS

| | | | | |
|---|---|---|---|---|
| 2007/0141458 | A1* | 6/2007 | Nagatani | ............... H01M 2/204 429/158 |
| 2008/0182162 | A1* | 7/2008 | Kim | ............... H01M 2/204 429/99 |
| 2009/0087737 | A1 | 4/2009 | Yamauchi et al. | |
| 2009/0123830 | A1* | 5/2009 | Kato | ............... H01M 2/202 429/160 |
| 2009/0208836 | A1* | 8/2009 | Fuhr | ............... H01M 2/1077 429/158 |
| 2010/0173190 | A1 | 7/2010 | Tsuchiya | |
| 2010/0233915 | A1* | 9/2010 | Kim | ............... H01M 2/206 439/754 |
| 2011/0045345 | A1 | 2/2011 | Tsuchiya et al. | |
| 2011/0244309 | A1 | 10/2011 | Byun et al. | |
| 2013/0157115 | A1 | 6/2013 | Kobayashi et al. | |

FOREIGN PATENT DOCUMENTS

| | | |
|---|---|---|
| JP | 2009-087693 A | 4/2009 |
| JP | 2009-087721 A | 4/2009 |
| JP | 2009-231145 A | 10/2009 |
| JP | 2009-283256 A | 12/2009 |
| JP | 2011-210725 A | 10/2011 |

* cited by examiner

ASSEMBLED BATTERY AND CELL CONNECTION METHOD

TECHNICAL FIELD

The present invention relates to an assembled battery and a cell connection method.

BACKGROUND ART

With a typical assembled battery configured by connecting multiple cells in series, adjacent cells are connected in series such that the positive electrode terminal of one of two adjacent cells is connected to the negative electrode terminal of the other of these cells by means of a bus bar. As a connection mechanism that connects the bus bar and the external terminals including the positive electrode terminal and the negative electrode terminal, a connection mechanism is known in which the external terminal is inserted into an opening formed in the bus bar, and a fixation screw is screwed into the end of the external terminal, thereby connecting the external terminal and the bus bar (see Patent document 1).

RELATED ART DOCUMENTS

Patent Documents

[Patent Document 1]
Japanese Patent Application Laid Open No. 2004-253311

In a case in which the external terminal and the bus bar are fixedly connected via a screw in the same way as with the aforementioned conventional method, in some cases, such a fixation screw loosens after being screwed in. Thus, there is room for further improvement from the viewpoint of improved reliability of the connection between the external terminal and the bus bar. In order to provide such improved reliability of the connection, an arrangement is conceivable in which a portion of a connecting member is welded to the external terminal, and a different portion of the connecting member is welded to the bus bar, thereby connecting the external terminal and the bus bar via the connecting member.

The present inventors have diligently studied such a mechanism for connecting the aforementioned external terminal and the bus bar via a connecting member by welding, and have found the following problem. That is to say, in a case in which such components are connected by welding, in some cases, heat generated in welding propagates to the main body of a cell through the external terminal. The heat propagating from the external terminal to the main body of the cell leads to degradation of the electric power generation of the cell. Thus, there is a need to suppress the propagation of heat generated in welding to the main body of the cell.

The present invention has been made in order to solve such a problem. Accordingly, it is a general purpose of the present invention to provide a technique for suppressing the propagation of heat generated in welding to the main body of a cell in a case in which an external terminal of the cell is connected to a terminal connection member by welding.

Means to Solve the Problem

An embodiment of the present invention relates to an assembled battery. The assembled battery comprises: multiple cells each including external terminals provided to a casing; a terminal connection member configured to electrically connect the external terminal of one of two adjacent cells to the external terminal of the other of these adjacent cells; an electrically conductive connecting member welded to the external terminal and the terminal connection member so as to connect the external terminal and the terminal connection member; a first welding portion at which the terminal connection member and the connecting member are welded; and a second welding portion at which the external terminal and the connecting member are welded. The connecting member comprises an intervening portion connected to the first welding portion, and a main body portion extending from the intervening portion up to the second welding portion. The intervening portion is configured to have a thickness that is smaller than that of the main body portion.

Another embodiment of the present invention also relates to an assembled battery. The assembled battery comprises: multiple cells each including external terminals provided to a casing; a terminal connection member configured to electrically connect the external terminal of one of two adjacent cells to the external terminal of the other of these adjacent cells; and an electrically conductive connecting member welded to the external terminal and the terminal connection member so as to connect the external terminal and the terminal connection member. The external terminal comprises an intervening portion connected to a welding portion connected to the connecting member, and a main body portion extending from the intervening portion toward the casing side. The intervening portion is configured to have a thickness that is smaller than that of the main body portion.

Yet another embodiment of the present invention also relates to an assembled battery. The assembled battery comprises: multiple cells each including external terminals provided to a casing; and a terminal connection member configured to electrically connect the external terminal of one of two adjacent cells to the external terminal of the other of these adjacent cells. The external terminal and the terminal connection member are connected to each other by means of welding. The terminal connection member comprises an intervening portion connected to a welding portion connected to the external terminal, and a main body portion extending from the intervening portion toward the external terminal side of the adjacent cell. The intervening portion is configured to have a thickness that is smaller than that of the main body portion.

With any one of the aforementioned embodiments, in a case in which welding is employed to connect the external terminal of the cell and the terminal connection member, such an arrangement suppresses the propagation of heat generated in the welding to the cell main body.

With any one of the aforementioned embodiments, the terminal connection member may have a through hole. Also, the external terminal may be arranged such that a part thereof passes through the through hole. Also, the connecting member may be welded to a part of the external terminal that protrudes from the through hole.

With any one of the aforementioned embodiments, the terminal connection member may have a through hole. Also, the external terminal may be arranged such that a part thereof is positioned within the through hole. Also, the terminal connection member and the external terminal may be welded within the through hole.

With any one of the aforementioned embodiments, with the intervening portion of the connecting member as a first intervening portion, and with the main body portion of the connecting member as a first main body portion, the external terminal may comprise a second main body portion extending from the casing side and a second intervening portion having a thickness that is smaller than that of the second main body portion and that protrudes from the second main body portion. Also, the terminal connection member may have a through hole. Also, the external terminal may be arranged such that the second intervening portion passes through the through hole. Also, the first welding portion may be connected to the first intervening portion and the terminal connection member. Also, the second welding portion may be connected to the first main body portion and a part of the second intervening portion that protrudes from the through hole.

With any one of the aforementioned embodiments, a tapered portion may be provided between the intervening portion and the main body portion such that its thickness gradually increases approaching the main body portion side from the intervening portion side.

With any one of the aforementioned embodiments, the intervening portion may have a tapered portion in a predetermined region extending from its end that is in contact with the welding portion connected to the terminal connection member, configured such that its thickness gradually reduces approaching the main body portion side from the aforementioned end of the intervening portion.

Yet another embodiment of the present invention relates to a cell connection method. The cell connection method is configured as a method for electrically connecting an external terminal of a cell and a terminal connection member configured to connect an external terminal of one of two adjacent cells to an external terminal of the other of these adjacent cells. The cell connection method comprises: preparing an electrically conductive connecting member comprising a main body portion and an intervening portion having a thickness that is smaller than that of the main body portion and that protrudes from the main body portion; connecting the connecting member and the terminal connection member by welding the intervening portion and the terminal connection member; and connecting the connecting member and the external terminal by welding the main body portion and the external terminal, at a timing selected from among before, after, and in parallel with the aforementioned connecting of the connecting member and the terminal connection member.

Yet another embodiment of the present invention also relates to a cell connection method. The cell connection method is configured as a method for electrically connecting an external terminal of a cell and a terminal connection member configured to connect an external terminal of one of two adjacent cells to an external terminal of the other of these adjacent cells. The cell connection method comprises: preparing an external terminal comprising a main body portion and an intervening portion having a thickness that is smaller than that of the main body portion and that protrudes from the main body portion; preparing an electrically conductive connecting member configured to provide a function of connecting the external terminal and the terminal connection member by being welded to the external terminal and the terminal connection member, as a different step from the aforementioned preparing of the external terminal; connecting the external terminal and the connecting member by welding the intervening portion and the connecting member; and connecting the connecting member and the terminal connection member by welding the connecting member and the terminal connection member, at a timing selected from among before, after, and in parallel with the aforementioned connecting of the external terminal and the connecting member.

Yet another embodiment of the present invention also relates to a cell connection method. The cell connection method is configured as a method for electrically connecting an external terminal of a cell and a terminal connection member configured to connect an external terminal of one of two adjacent cells to an external terminal of the other of these adjacent cells. The cell connection method comprises: preparing a terminal connection member comprising a main body portion and an intervening portion having a thickness that is smaller than that of the main body portion and that protrudes from the main body portion; and connecting the terminal connection member and the external terminal by welding the intervening portion and the external terminal.

With any one of the aforementioned embodiments, a tapered portion may be provided between the intervening portion and the main body portion such that its thickness gradually increases approaching the main body portion side from the intervening portion side.

With any one of the aforementioned embodiments, the intervening portion may have a tapered portion in a predetermined region extending from its end that is in contact with the welding portion connected to the terminal connection member, configured such that its thickness gradually reduces approaching the main body portion side from the aforementioned end of the intervening portion.

Advantage of the Present Invention

With the present invention, in a case in which welding is employed to connect an external terminal of a cell and a terminal connection member, such an arrangement suppresses the propagation of heat generated in the welding to the cell main body.

BEST MODE FOR CARRYING OUT THE INVENTION

Description will be made regarding an embodiment of the present invention with reference to the drawings. It should be noted that, in all the drawings, the same components are denoted by the same reference symbols, and description thereof will be omitted as appropriate.

Embodiment 1

Figure 1:
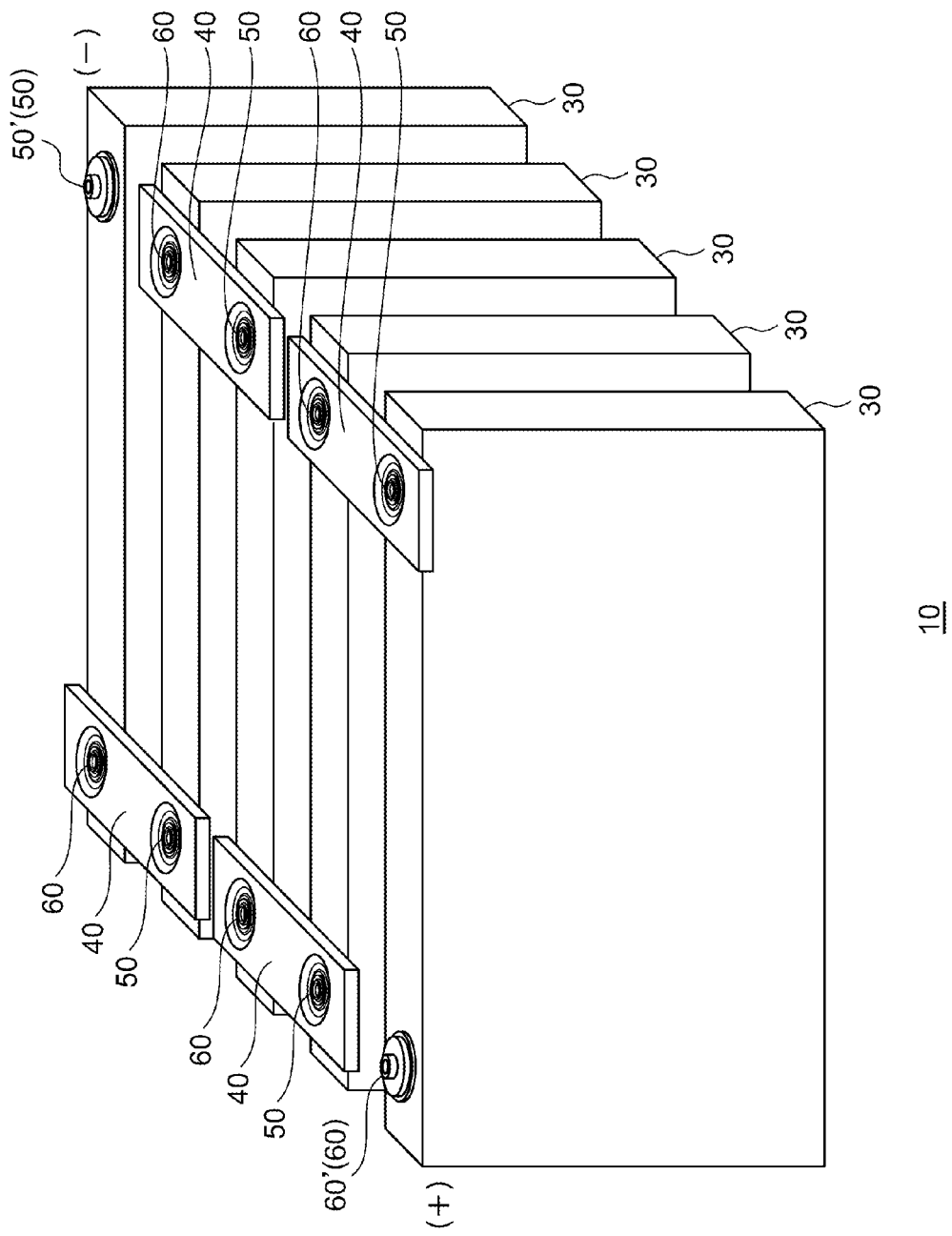
FIG. 1 is a perspective view showing a schematic configuration of an assembled battery according to an embodiment 1.

FIG. 1 is a perspective view showing a schematic configuration of an assembled battery according to an embodiment 1. As shown in FIG. 1, an assembled battery 10 includes multiple cells 30 and bus bars 40 (terminal connection members) configured to connect the cells 30. Description will be made in the present embodiment regarding an arrangement in which a total of five cells 30 are connected in series so as to form the assembled battery 10. It should be noted that the number of cells 30 is not restricted in particular. FIG. 1 shows an arrangement in which all of the five cells 30 are connected in series. Also, a part of the cells 30 may be connected in parallel.

The five cells 30 each include a flat, box-shaped casing, and are arranged in parallel at predetermined intervals such that their main faces are arranged approximately in parallel and such that the main faces of adjacent cells face each other. On the top face of the casing of each cell 30, a negative electrode terminal 50 is provided such that it is arranged close to one side of the top face along the longitudinal direction, and a positive electrode terminal 60 is provided such that it is arranged close to the other side of the top face. The negative electrode terminal 50 and the positive electrode terminal 60 will be collectively referred to as the "external terminals" hereafter. The cells 30 are arranged such that the arrangement of the positive electrode 50 and the negative electrode 60 of each cell is opposite to that of the adjacent cell 30. Each pair of adjacent cells 30 are arranged such that the positive electrode terminal 60 of one cell 30 is connected to the negative electrode terminal 50 of the other cell 30 by means of the bus bar 40, thereby connecting the five cells 30 in series.

The cells 30 are housed in a housing (not shown). Such an arrangement allows the positive electrode terminal 60', which is one terminal of the series connection of the cells 30, and the negative electrode terminal 50', which is the other of its terminals, to be connected to an external load (not shown) via external wiring (not shown).

Figure 2:
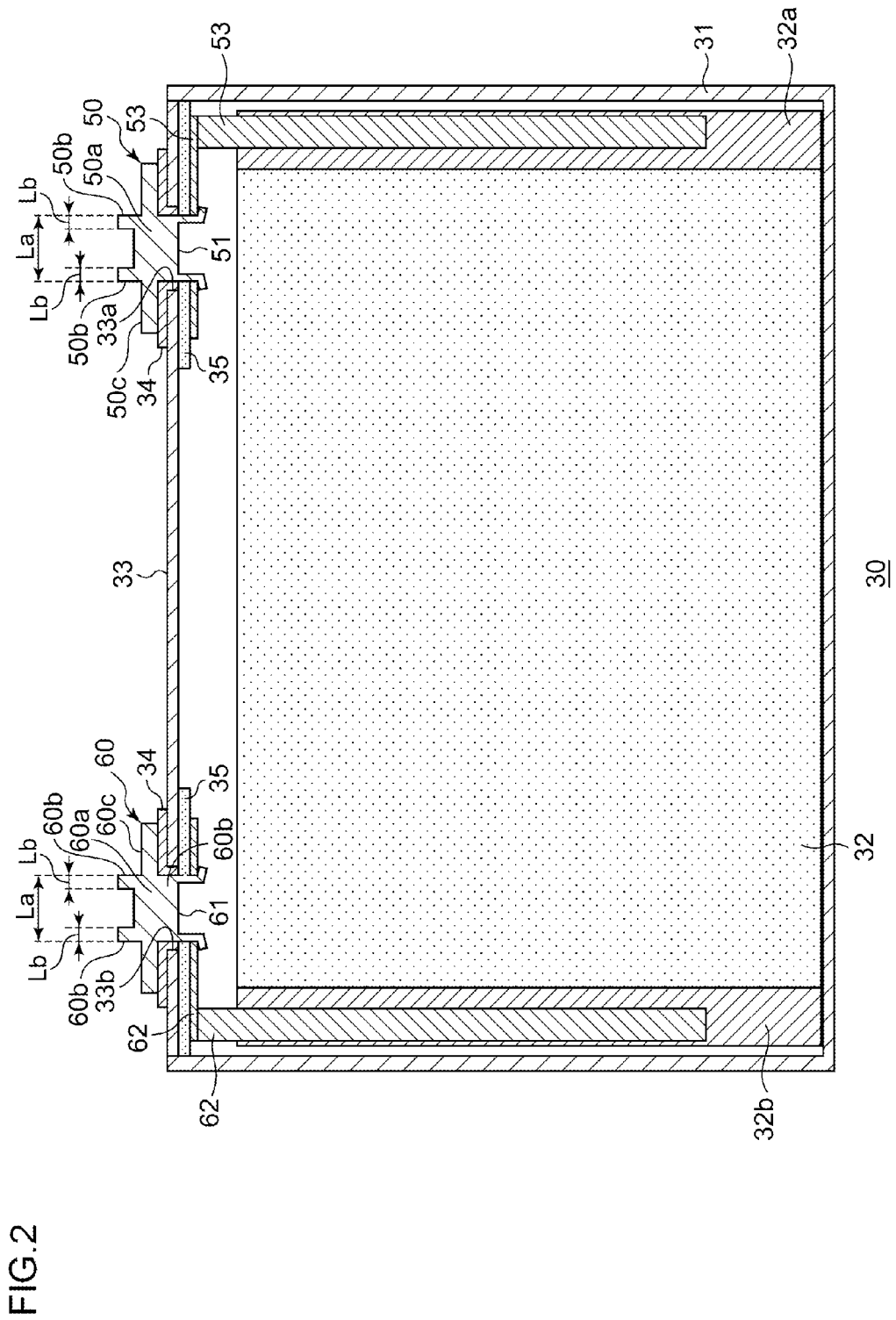
FIG. 2 is a cross-sectional diagram showing a schematic configuration of a cell.

FIG. 2 is a cross-sectional view showing a schematic configuration of the cell. As shown in FIG. 2, the cell 30 has a configuration in which a wound electrode body 32 having a positive electrode and a negative electrode which are wound in a spiral is housed in an outer package (casing) 31 laterally with respect to the package axis of the outer package 31. The opening of the outer package 31 is sealed by means of a sealing plate 33 configured as a component of the casing. The negative electrode terminal 50 and the positive electrode terminal 60 are provided to the sealing plate 33. Furthermore, a gas discharge valve (not shown) is formed in the sealing plate 33.

The negative electrode terminal 50 has a main body portion 50a (second main body portion) and an intervening portion 50b (second intervening portion) configured to have a thickness that is smaller than that of the main body portion 50a and to protrude from the main body portion 50a. The main body portion 50a is formed in approximately a cylindrical shape, and includes a flange portion 50c around its outer edge. The main body portion 50a of the negative electrode terminal 50 is inserted into the negative electrode opening 33a formed in the sealing plate 33 in a state in which the gasket 34 is in contact with the side face of the main body portion 50a. Furthermore, the gasket 34 is arranged such that it is in contact with the face of the flange portion 50c that faces the sealing plate 33. Moreover, the main body portion 50a is connected to a negative electrode tab member 53 on the inner side of the cell with the sealing plate 33 as a boundary.

At the end of the main body portion 50a on the outer side of the cell, the intervening portion 50b having an approximately cylindrical shape is monolithically formed with the main body portion 50a such that it protrudes upward. At the other end of the main body portion 50a on the inner side of the cell, a recess 51 is provided so as to define the side wall along the negative electrode opening 33a. By swaging the edge of the recess 51 such that it expands outward, such an arrangement allows the negative electrode terminal 50 to be fixedly mounted on the negative electrode tab member 53.

An insulating plate 35 is provided between the negative electrode tab member 53 and the face of the sealing plate 33 on the inner side of the cell. The insulating plate 35 is arranged such that it is in contact with the gasket 34 in the negative electrode opening 33a. Such an arrangement insulates the negative electrode tab member 53 and the negative electrode terminal 50 from the sealing plate 33. The negative electrode tab member 53 is connected to a negative electrode collecting plate set 32a protruding from one end of the electrode body 32. It should be noted that the negative electrode collecting plate set 32a is configured as a bundle of multiple negative electrode collecting plates protruding from one end of the electrode body 32.

The positive electrode terminal 60 has a main body portion 60a (second main body portion) and an intervening portion 60b (second intervening portion) configured to have a thickness that is smaller than that of the main body portion 60a and to protrude from the main body portion 60a. The main body portion 60a is formed in approximately a cylindrical shape, and includes a flange portion 60c around its outer edge. The main body portion 60a of the positive electrode terminal 60 is inserted into the positive electrode opening 33b formed in the sealing plate 33 in a state in which the gasket 34 is in contact with the side face of the main body portion 60a. Furthermore, the gasket 34 is arranged such that it is in contact with the face of the flange portion 60c that faces the sealing plate 33. Moreover, the main body portion 60a is connected to a positive electrode tab member 62 on the inner side of the cell with the sealing plate 33 as a boundary.

At the end of the main body portion 60a on the outer side of the cell, the intervening portion 60b having an approximately cylindrical shape is monolithically formed with the main body portion 60a such that it protrudes upward. At the other end of the main body portion 60a on the inner side of the cell, a recess 61 is provided so as to define the side wall along the positive electrode opening 33b. By swaging the edge of the recess 61 such that it expands outward, such an arrangement allows the positive electrode terminal 60 to be fixedly mounted on the positive electrode tab member 62.

An insulating plate 35 is provided between the positive electrode tab member 62 and the face of the sealing plate 33 on the inner side of the cell. The insulating plate 35 is arranged such that it is in contact with the gasket 34 in the positive electrode opening 33b. Such an arrangement insulates the positive electrode tab member 62 and the positive electrode terminal 60 from the sealing plate 33. The positive electrode tab member 62 is connected to a positive electrode collecting plate set 32b protruding from the other end of the electrode body 32. It should be noted that the positive electrode collecting plate set 32b is configured as a bundle of multiple positive electrode collecting plates protruding from the other end of the electrode body 32.

Description has been made in the present embodiment regarding an arrangement in which the main body portions 50a and 60a are each configured to have an approximately cylindrical shape. Also, the main body portions 50a and 60a may each be configured to have a hollow circular pipe shape obtained by eliminating, from the aforementioned main body portion having an approximately cylindrical shape, a core portion along the axis. In this case, this circular pipe is configured to have a thickness that is greater than that of the intervening portion 50b or that of the intervening portion 60b.

Each bus bar 40 is configured as a band-shaped member formed of an electrically conductive material such as metal or the like. Through holes 41 (see FIG. 4) are formed at both ends of the bus bar 40. The negative electrode terminal 50 of one of two adjacent cells 30 is inserted into one of the through holes 41 formed in the bus bar 40. Furthermore, the positive electrode terminal 60 of the other of these adjacent cells 30 is inserted into the other of the through holes 41.

Figure 3:
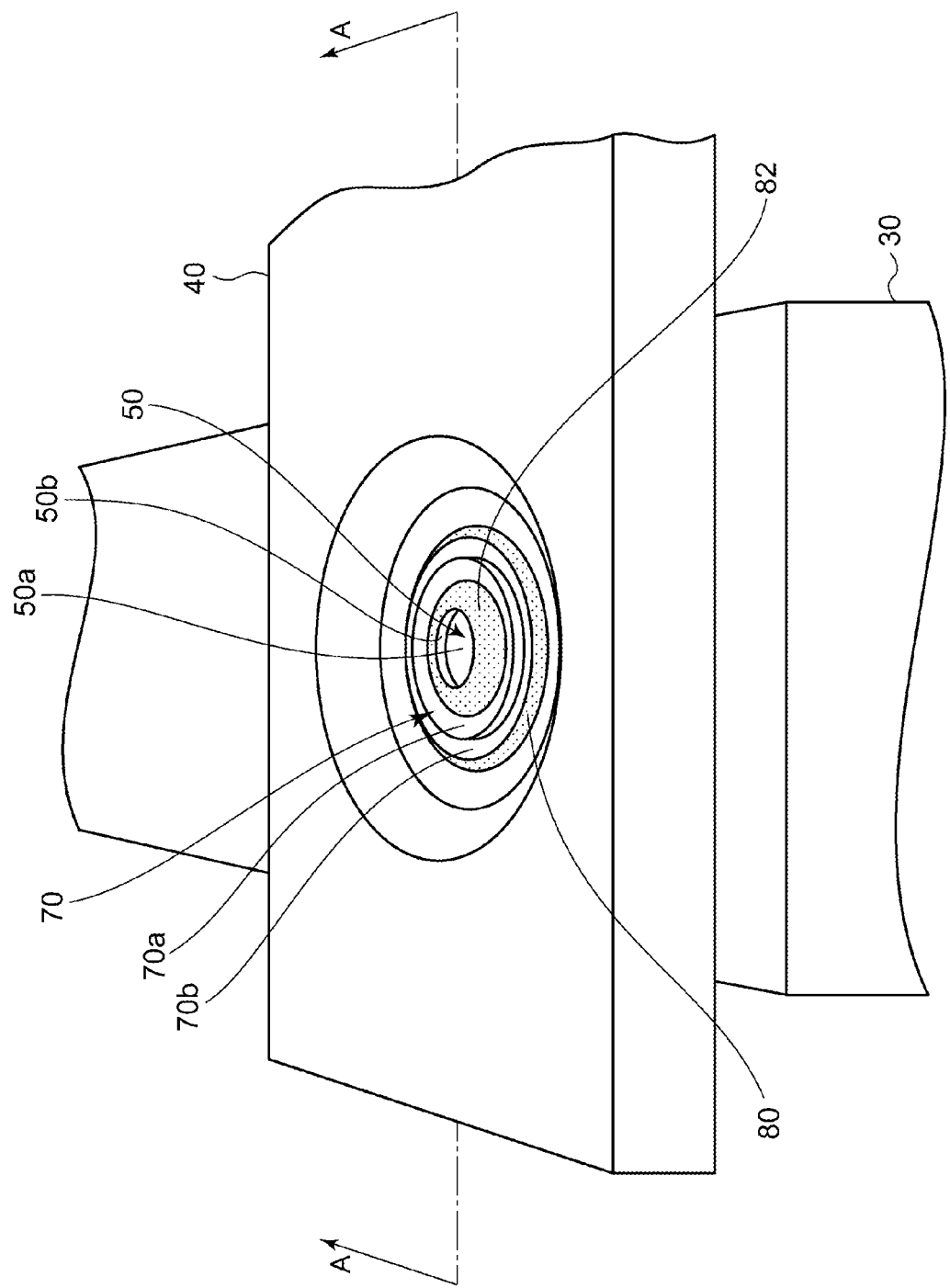
FIG. 3 is an enlarged perspective view showing a schematic configuration in the vicinity of a connection portion that connects an external terminal of the cell and a bus bar.
Figure 4:
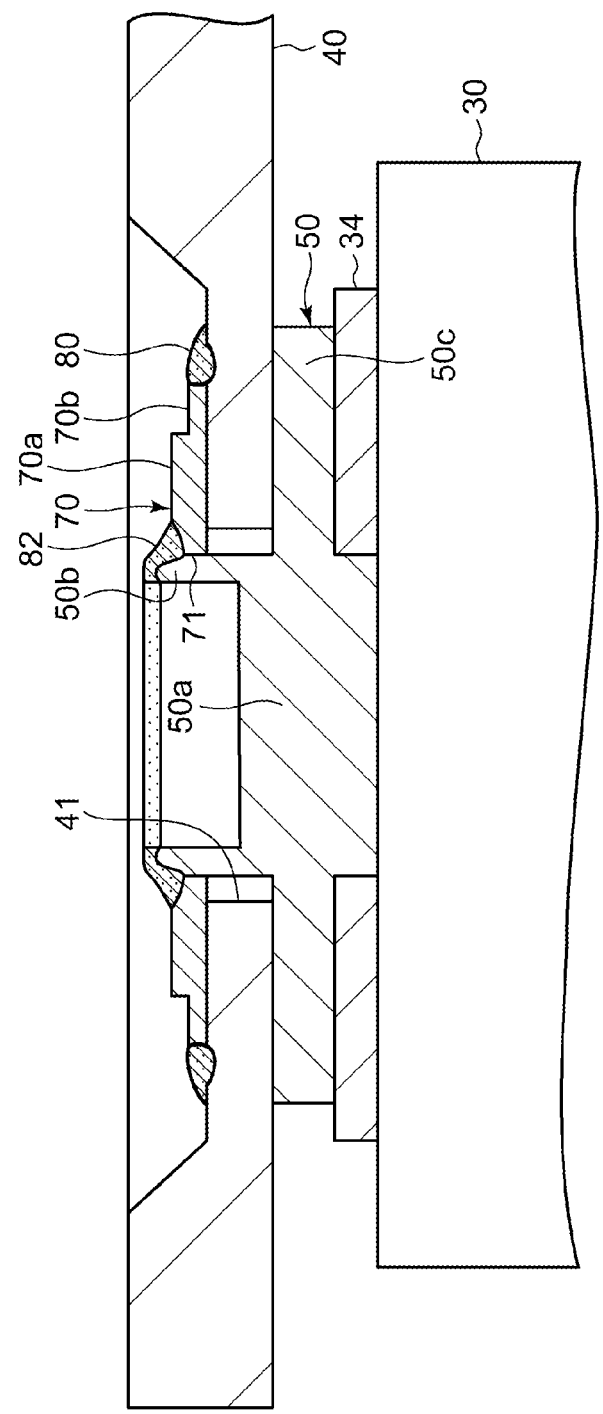
FIG. 4 is a cross-sectional view taken along the line A-A in FIG. 3.
Figure 5A:
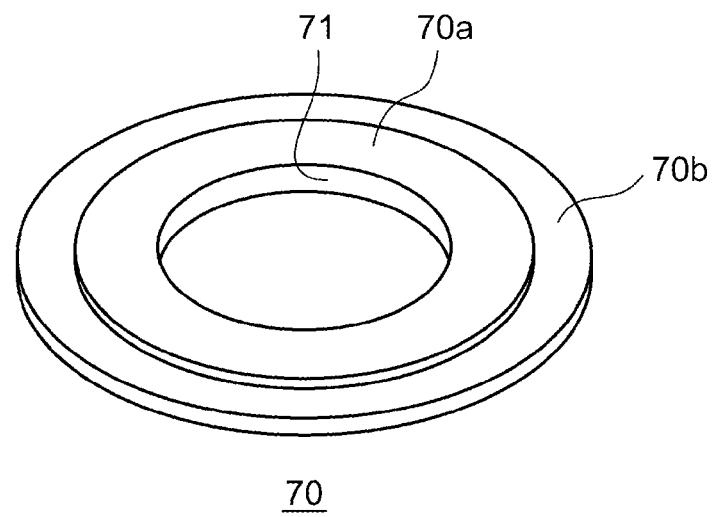
FIG. 5A is a perspective view showing a schematic configuration of a connection member.
Figure 5B:
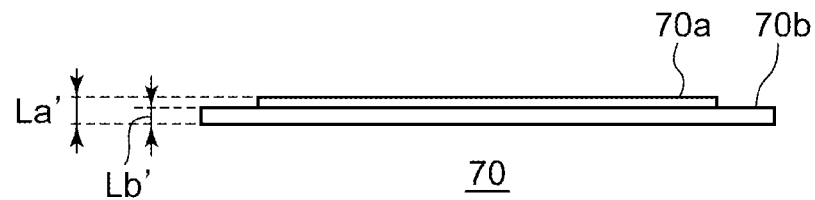
FIG. 5B is a side view showing a schematic configuration of the connection member.

FIG. 3 is an enlarged perspective view showing a schematic configuration in the vicinity of the connection portion that connects the external terminal of the cell and the bus bar. FIG. 4 is a cross-sectional view taken along the line A-A in FIG. 3. FIG. 5A is a perspective view showing a schematic configuration of the connecting member. FIG. 5B is a side view showing a schematic configuration of the connecting member. It should be noted that FIGS. 3 and 4 each show the negative electrode terminal 50 as an example of the external terminal.

As shown in FIGS. 3 and 4, the negative electrode terminal 50 and the bus bar 40 are connected via a connecting member 70. That is to say, a portion of the connecting member 70 is welded to the negative electrode terminal 50, and a different portion of the connecting member 70 is welded to the bus bar 40, thereby connecting the negative electrode terminal 50 and the bus bar 40 to each other.

As shown in FIGS. 5A and 5B, the connecting member 70 is configured as a ring-shaped member formed of an electrically conducive material such as metal or the like. The connecting member 70 includes a main body portion 70a (first main body portion) having a through hole 71 at its central portion, and an intervening portion 70b (first intervening portion) configured to have a thickness that is smaller than that of the main body portion 70a and to protrude from the outer face of the main body portion 70a. The main body portion 70a and the intervening portion 70b are monolithically formed. The thickness (represented by the length La' in FIG. 5B) of the main body portion 70a is on the order of twice the thickness (represented by the length Lb' in FIG. 5B) of the intervening portion 70b, for example. Furthermore, the length of the protrusion of the intervening portion 70b, i.e., the length between the tip of the intervening portion 70b and the other end connected to the main body portion 70a, is designed to be greater than the radius of the laser to be emitted in welding.

The negative electrode terminal 50 is inserted into the through hole 41 of the bus bar 40. The through hole 41 of the bus bar 40 is preferably formed to have a diameter that is greater than that of the intervening portion 50b in order to absorb the margin of error of the distance between the intervening portions 50b provided to the adjacent cells 30. The bus bar 40 is arranged such that its lower face is in contact with the upper face of the flange portion 50c of the negative electrode terminal 50. In this state, the negative electrode terminal 50 is arranged such that its intervening portion 50b passes through the through hole 41 and protrudes from the through hole 41. Furthermore, the negative electrode terminal 50 is arranged such that its intervening portion 50b passes through the through hole 71 of the connecting member 70 arranged on the bus bar 40. The connecting member 70 is arranged such that its main body portion 70a is adjacent to the outer face of the intervening portion 50b of the negative electrode terminal 50.

Moreover, a welding portion 80 (first welding portion) is provided such that it is connected to the end of the intervening portion 70b of the connecting member 70 and the upper face of the bus bar 40, thereby connecting the connecting member 70 and the bus bar 40 via the welding portion 80. As described later, the welding portion 80 is formed by mainly melting an outer edge portion of the intervening portion 70b by means of laser emission. Thus, the outer edge (one end) of the remaining portion of the intervening portion 70b is connected to the welding portion 80.

Furthermore, a welding portion 82 (second welding portion) is provided such that it is connected to the intervening portion 50b of the negative electrode terminal 50 and the main body portion 70a of the connecting member 70 arranged such that it extends from the other end of the intervening portion 70b up to a position in the vicinity of the intervening portion 50b of the negative electrode terminal 50 that protrudes from the through hole 41. The connecting member 70 and the negative electrode terminal 50 are connected by means of the welding portion 82. As described later, the welding portion 82 is formed by mainly melting a portion of the intervening portion 50b protruding from the upper face of the main body portion 70a. Thus, the end of the remaining portion of the intervening portion 50b is connected to the welding portion 82. It should be noted that the main body portion 70a of the connecting member 70 is arranged such that its end portion on the side opposite to the intervening portion 70b is connected to the welding portion 82.

[Cell Connection Method]

Figure 6A:
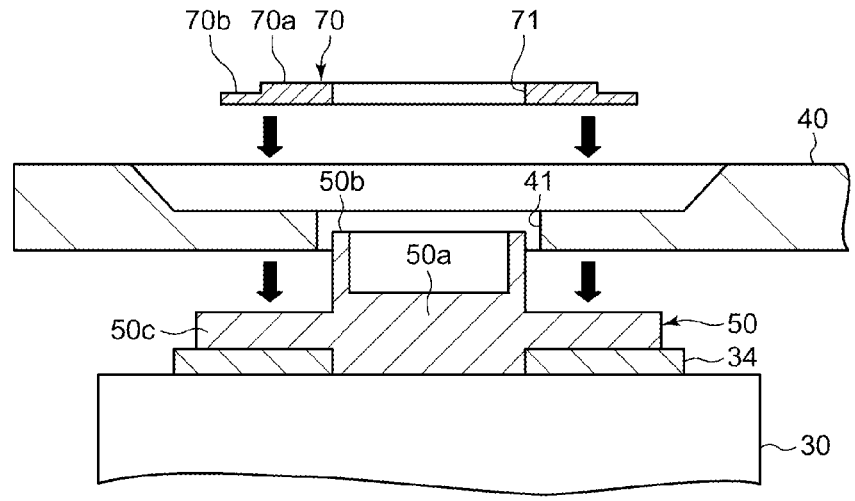
FIGS. 6A through 6C are cross-sectional process diagrams each showing a cell connection method according to the embodiment 1.
Figure 6B:
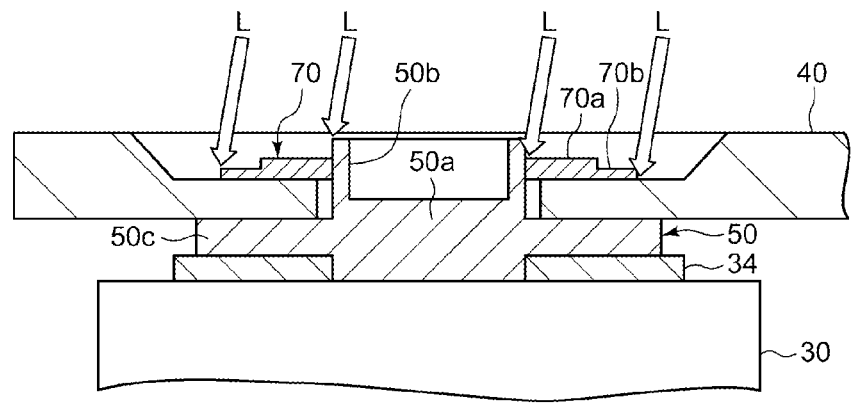
Figure 6C:
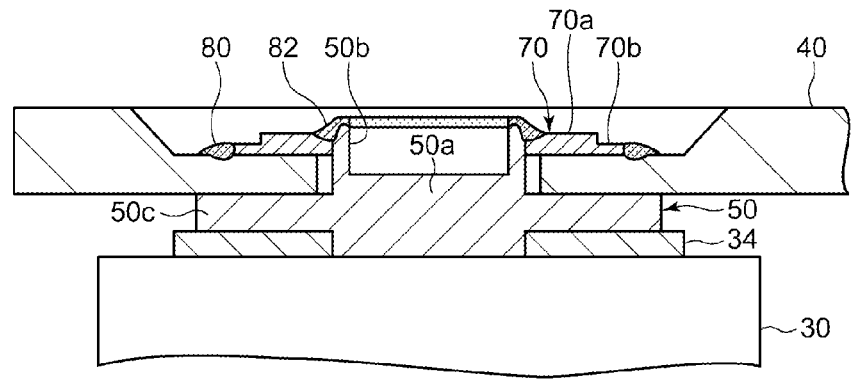

Next, description will be made with reference to FIGS. 6A through 6C regarding a cell connection method for electrically connecting the external terminal of each cell 30 to the bus bar 40. FIGS. 6A through 6C are cross-sectional process diagrams each showing a cell connection method according to the embodiment 1. It should be noted that FIGS. 6A through 6C each show the negative electrode terminal 50 as an example of the external terminal.

First, as shown in FIG. 6A, the cell 30 is prepared, which includes the external terminals each comprising the main body portion 50a and the intervening portion 50b having a thickness that is smaller than that of the main body portion 50a and that protrudes from the main body portion 50a. Furthermore, the connecting member 70 is prepared, which includes the main body portion 70a and the intervening portion 70b having a thickness that is smaller than that of the main body portion 70a and that protrudes from the main body portion 70a. In addition, the bus bar 40 is prepared. Next, the bus bar 40 is mounted on the negative electrode terminal 50, after the negative electrode terminal 50 and the through hole 41 of the bus bar 40 are aligned. Subsequently, the connecting member 70 is mounted on the bus bar 40, after the negative electrode terminal 50 and the through hole 71 of the connecting member 70 are aligned.

Next, as shown in FIG. 6B, a laser L is emitted to a position in the vicinity of the outer edge of the intervening portion 70b of the connecting member 70 so as to melt the outer edge of the intervening portion 70b and a part of the bus bar 40, thereby welding intervening portion 70b and the bus bar 40. Furthermore, the laser L is emitted to a position in the vicinity of the outer edge of the intervening portion 50b of the negative electrode terminal 50 so as to melt the outer edge of the intervening portion 50b and a part of the main body portion 70a, thereby welding the main body portion 70a and intervening portion 50b. The laser L is emitted over the entire circumference of the exposed boundary between the intervening portion 70b and the bus bar 40, and over the entire circumference of the exposed boundary between the intervening portion 70b and the bus bar 40, and over the entire circumference of the exposed boundary between the main body portion 70a and the intervening portion 50b. It should be noted that the region to be irradiated by the laser L is not restricted to such a region.

By means of the emission of the laser L as described above, as shown in FIG. 6C, a welding portion 80 is formed so as to connect the remaining portion of the intervening portion 70b and the bus bar 40, thereby connecting the connecting member 70 and the bus bar 40. Furthermore, a welding portion 82 is formed so as to connect the remaining portion of the intervening portion 50b and the main body portion 70a, thereby connecting the connecting member 70 and the negative electrode terminal 50. It should be noted that the order of the step in which the connecting member 70 is connected to the bus bar 40 and the step in which the connecting member 70 is connected to the negative electrode terminal 50 is not restricted in particular. Also, these steps may be executed in parallel.

Figure 7A:
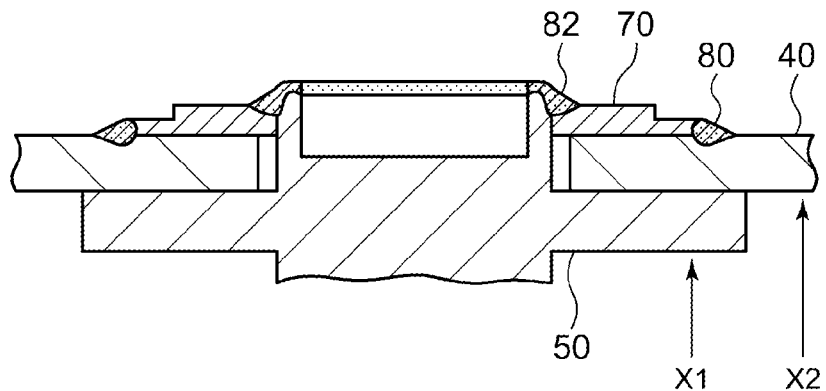
FIG. 7A is a cross-sectional diagram for describing a method for measuring the electrical resistance between the external terminal and the bus bar.
Figure 7B:
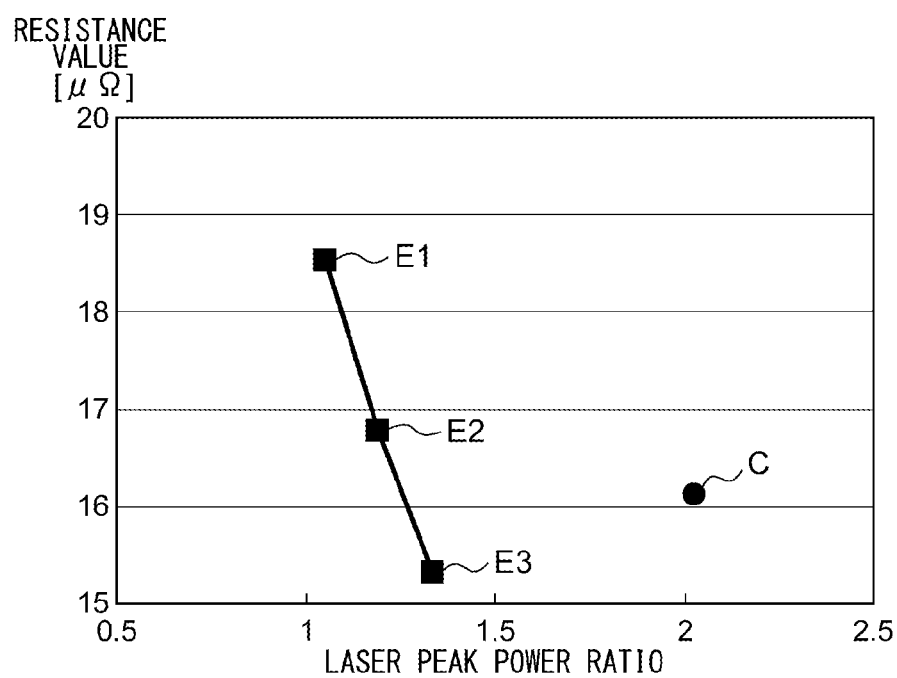
FIG. 7B is a diagram showing the relation between the electrical resistance between the external terminal and the bus bar and the power peak ratio of the laser emitted when the bus bar and the connection member are welded.

Next, description will be made regarding the state of the connection between the external terminal and the bus bar 40 thus connected as described above. FIG. 7A is a cross-sectional diagram for describing a method for measuring the electrical resistance between the external terminal and the bus bar. FIG. 7B is a diagram showing the relation between the electrical resistance between the external terminal and the bus bar and the power peak ratio of the laser emitted when the bus bar and the connecting member are welded.

FIG. 7A shows the negative electrode terminal 50 as an example of the external terminal. In FIG. 7B, the points E1 through E3 represent the results of three measurement conditions, which were obtained by measuring the configuration according to the embodiment 1. The difference between the three measurement conditions is in the peak value of the laser power when the bus bar 40 and the connecting member 70 are welded. Point C represents the result obtained by measuring a configuration of a comparison example employing a connecting member 70 having no intervening portion 70b. The vertical axis represents the resistance value [μΩ]. The horizontal axis represents the ratio of the laser power peak value using, as the reference value (1), the laser power peak value used in the measurement condition in which the result represented by point E1 was obtained. It should be noted that, for all the measurement points, the connecting member 70 and the negative electrode terminal 50 were welded under the same conditions.

As shown in FIG. 7A, the voltage was measured between a voltage measurement position X1 on the negative electrode terminal 50 and a voltage measurement position X2 on the bus bar 40 in a state in which a constant current was flowing from the bus bar 40 to the negative electrode terminal 50 via the connecting member 70, so as to measure the resistance value between the negative electrode terminal 50 and the bus bar 40. As a result, as shown in FIG. 7B, it has been found that the embodiment 1 requires relatively low laser power to provide the same resistance value, as compared with the comparison example. Thus, the assembled battery 10 according to the embodiment 1 allows the power of the laser to be emitted in the welding to be reduced. This reduces heat generated in the welding by means of laser emission.

As described above, with the assembled battery 10 according to the present embodiment, the connecting member 70 has the intervening portion 70b having a thickness that is smaller than that of its main body portion 70a. Furthermore, the intervening portion 70b is welded to the bus bar 40. That is to say, a small-thickness portion that can be easily melted by means of laser emission is provided. The connecting member 70 and the bus bar 40 are welded using this small-thickness portion. Thus, such an arrangement allows the power of the laser to be emitted in the welding to be reduced. This allows heat generated in the welding to be reduced. As a result, such an arrangement suppresses the propagation of heat generated in the welding to the cell main body via the connecting member 70 and the external terminal.

Furthermore, the intervening portion 70b, which is provided to the path of heat propagation from the welding portion 80 that connects the connecting member 70 and the bus bar 40 up to the cell main body, has a smaller cross-sectional area, i.e., a smaller diameter, than that of the main body portion 70a. Thus, such an arrangement suppresses the propagation of heat from the welding portion 80 to the cell main body. Moreover, such an arrangement has the welding portion 80 formed by melting the tip of the intervening portion 70b. Thus, such an arrangement provides an increased welding area as compared with an arrangement having no intervening portion 70b. Thus, such an arrangement provides improved strength of the connection between the connecting member 70 and the bus bar 40.

Furthermore, with the assembled battery 10 according to the present embodiment, the external terminal has the intervening portion 50b or 60b having a thickness that is smaller than that of the main body portion 50a or 60a. With such an arrangement, the intervening portions 50b and 60b are each welded to the connecting member 70. That is to say, the intervening portions 50b and 60b, which are each provided to the path of heat propagation from the welding portion 82 that connects the connecting member 70 and the corresponding external terminal up to the cell main body, has a smaller cross-sectional area than those of the main body portions 50a and 60a. Thus, such an arrangement suppresses the propagation of heat from the welding portion 82 to the cell main body, as compared with an arrangement including no intervening portion 50b or 60b.

Furthermore, the connecting member 70 is configured such that one end of the intervening portion 70b is connected to the welding portion 80, and such that the other end of the intervening portion 70b is connected to the main body portion 70a. Thus, in a case in which force is applied so as to displace the lower face of the connecting member 70 from the upper face of the bus bar 40 due to relative displacement between the external terminal and the bus bar 40 or the like, the other end region of the intervening portion 70b plastically deforms. Thus, such an arrangement prevents stress from concentrating at the welding portion 80 even in such a case. Such an arrangement provides improved reliability of the connection between the connecting member 70 and the bus bar 40.

Figure 8A:
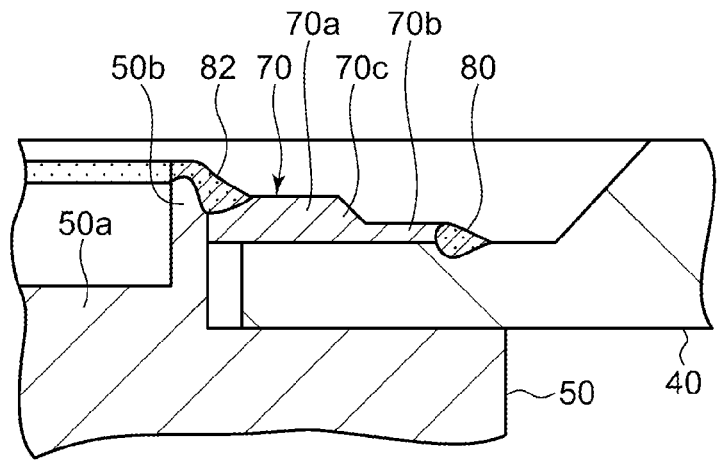
FIG. 8A is an enlarged cross-sectional diagram showing a schematic configuration in the vicinity of the connection portion that connects the external terminal and the bus bar included in the assembled battery according to a modification 1.
Figure 8B:
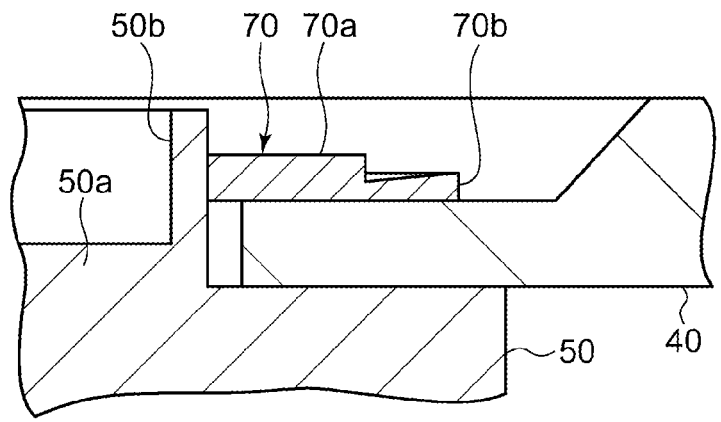
FIG. 8B is an enlarged cross-sectional diagram showing a schematic configuration before welding in the vicinity of the connection portion that connects the external terminal and the bus bar included in the assembled battery according to a modification 2.
Figure 8C:
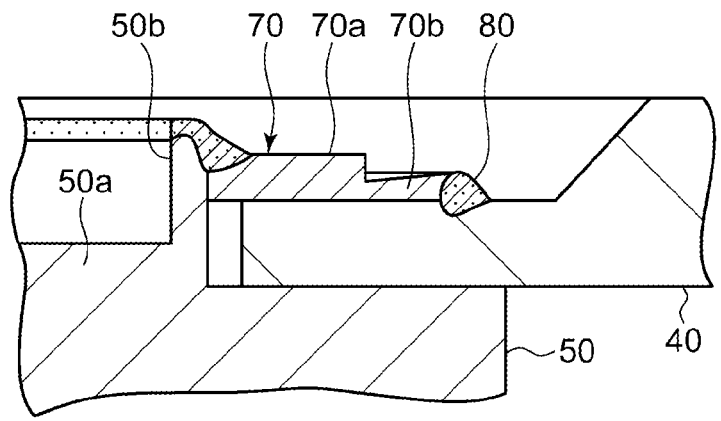
FIG. 8C is an enlarged cross-sectional diagram showing a schematic configuration after welding in the vicinity of the connection portion that connects the external terminal and the bus bar included in the assembled battery according to the modification 2.

Description will be made below regarding a modification of the aforementioned embodiment 1. FIG. 8A is an enlarged cross-sectional diagram showing a schematic configuration in the vicinity of the connection portion that connects the external terminal and the bus bar included in the assembled battery according to a modification 1. FIG. 8B is an enlarged cross-sectional diagram showing a schematic configuration before welding in the vicinity of the connection portion that connects the external terminal and the bus bar included in the assembled battery according to a modification 2. FIG. 8C is an enlarged cross-sectional diagram showing a schematic configuration after welding in the vicinity of the connection portion that connects the external terminal and the bus bar included in the assembled battery according to the modification 2. It should be noted that FIGS. 8A, 8B, and 8C each show the negative electrode terminal 50 as an example of the external terminal.

[Modification 1]

As shown in FIG. 8A, with the assembled battery 10 according to the modification 1, the connecting member 70 includes a tapered portion 70c between the intervening portion 70b and the main body portion 70a. The tapered portion 70c is configured in such a shape that its thickness gradually increases approaching the main body portion 70a side from the intervening portion 70b side.

As described above, by providing the tapered portion 70c between the intervening portion 70b and the main body portion 70a, such an arrangement provides improved strength of the connection region of the connecting member 70 which connects the main body portion 70a and the intervening portion 70b. Thus, such an arrangement provides improved reliability of the connection between the external terminal and the bus bar 40. Furthermore, such an arrangement allows the intervening portion 70b to have a smaller thickness. Thus, such an arrangement allows the power of the laser emission to be reduced. Furthermore, such an arrangement allows the path of heat propagation to be narrowed. Thus, such an arrangement suppresses heat generation in the welding, and suppresses the propagation of heat generated in the welding to the cell main body.

Furthermore, by providing the tapered portion 70c, in a step in which the intervening portion 70b of the connecting member 70 and the bus bar 40 are welded, such an arrangement allows the laser L to be emitted in a direction along which the main body portion 70a extends. Thus, such an arrangement provides an improved degree of freedom in the step for connecting the connecting member 70 and the bus bar 40.

[Modification 2]

As shown in FIGS. 8B and 8C, with the assembled battery 10 according to the modification 2, the intervening portion 70b of the connecting member 70 is configured in a tapered shape in a predetermined region from its tip portion such that its thickness gradually reduces approaching the main body portion 70a side from the tip portion. That is to say, the intervening portion 70b is configured such that its thickness gradually becomes greater approaching its tip portion side from the main body portion 70a side. It should be noted that, in the present modification, the intervening portion 70b is configured to have a thickness that becomes gradually smaller over the entire region from the tip portion up to the end that is in contact with the main body portion 70a. However, the region in which the intervening portion 70b has a tapered shape is not restricted to such an arrangement.

Such an arrangement provides an increased amount of a melting material that forms the welding portion 80 while maintaining an advantage of allowing the power of the laser emission in the welding to be reduced and an advantage of narrowing the path of heat propagation from the welding portion 80 to the cell main body. Thus, such an arrangement allows the connecting member 70 and the bus bar 40 to be connected in a surer manner.

Furthermore, after the welding portion 80 is formed, such an arrangement provides an increased connection area between the welding portion 80 and the intervening portion 70b, as compared with the embodiment 1. Thus, such an arrangement provides improved strength of the connection between the connecting member 70 and the bus bar 40.

Second Embodiment

An assembled battery 10 according to an embodiment 2 has a configuration in which an external terminal is directly connected to a bus bar 40. Description will be made below regarding the present embodiment. The main configurations of the assembled battery 10 and the cell 30 according to the present embodiment are basically the same as those described in the embodiment 1. The same components as those in the embodiment 1 are denoted by the same reference symbols, and description thereof will be omitted as appropriate.

Figure 9:
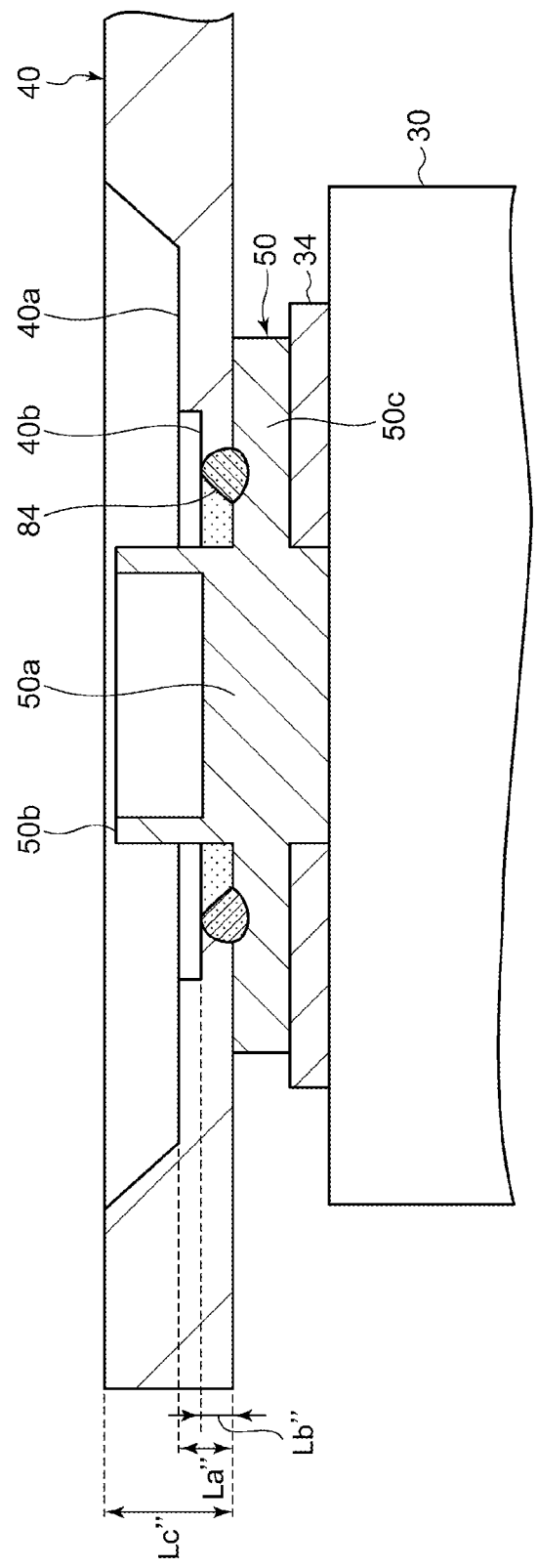
FIG. 9 is an enlarged cross-sectional diagram showing a schematic configuration in the vicinity of a connection portion that connects the external terminal and the bus bar included in the assembled battery according to the embodiment 2.

FIG. 9 is an enlarged cross-sectional diagram showing a schematic configuration in the vicinity of a connection portion that connects the external terminal and the bus bar included in the assembled battery according to the embodiment 2. It should be noted that FIG. 9 shows the negative electrode terminal 50 as an example of the external terminal.

As shown in FIG. 9, with the assembled battery 10 according to the present embodiment, the bus bar 40 has a main body portion 40a, an intervening portion 40b having a thickness that is smaller than that of the main body portion 40a and that protrudes from the main body portion 40a, and a through hole 41. The main body portion 40a and the intervening portion 40b are monolithically formed. The intervening portion 40b is formed such that it extends over the entire circumference of the through hole 41 (see FIG. 10A) formed in the bus bar 40. The thickness (represented by the length La" in FIG. 9) of the main body portion 40a is on the order of approximately twice the thickness (represented by the length Lb" in FIG. 9) of the intervening portion 40b, for example. Furthermore, the protrusion length of the intervening portion 40b, i.e., the length from the tip of the intervening portion 40b up to its end that is in contact with the main body portion 40a, is designed to be greater than the radius of the laser to be emitted in the welding. With the present embodiment, the main body portion 40a includes a portion having a small thickness (represented by the length La" in FIG. 9) that is in contact with the intervening portion 40b, and a portion having a large thickness (represented by the length Lc" in FIG. 9) configured such that it extends on the outer side of the aforementioned portion having a small thickness. Also, the main body portion 40a may be configured to have a constant thickness.

The negative electrode terminal 50 is inserted into the through hole 41 formed in the bus bar 40. The bus bar 40 is arranged such that its lower face is in contact with the upper face of the flange portion 50c of the negative electrode terminal 50. Furthermore, the bus bar 40 is arranged such that the intervening portion 50b of the negative electrode terminal 50 passes through the through hole 41 and protrudes from the through hole 41. In this state, a welding portion 84 is provided in the through hole 41 such that it is connected to the tip of the intervening portion 40b of the bus bar 40 and the upper face of the flange portion 50c of the negative electrode terminal 50. The bus bar 40 and the negative electrode terminal 50 are connected by means of the welding portion 84. As described later, the welding portion 84 is mainly formed by melting the tip of the intervening portion 40b by means of laser emission. Accordingly, the tip (one end) of the remaining portion of the intervening portion 40b is connected to the welding portion 84. Furthermore, the main body portion 40a is arranged such that it extends from the other end of the intervening portion 40b toward the side of the external terminal of the adjacent cell 30.

[Cell Connection Method]

Figure 10A:
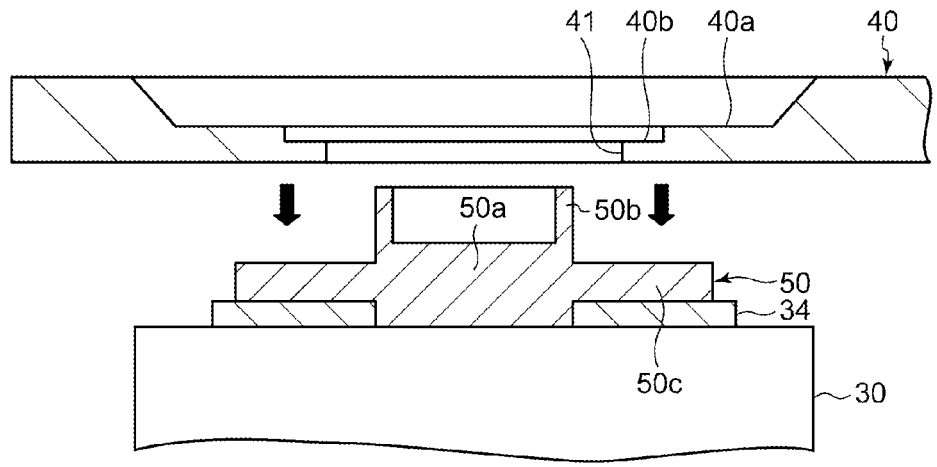
FIGS. 10A through 10C are cross-sectional process diagrams each showing a cell connection method according to the embodiment 2.
Figure 10B:
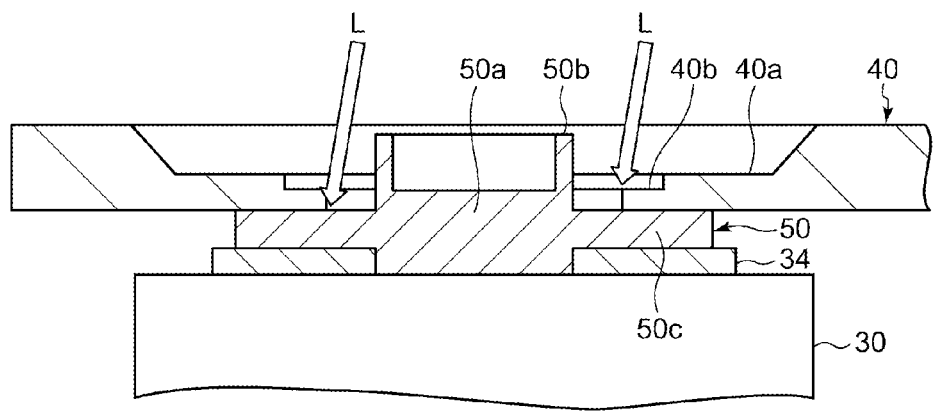
Figure 10C:
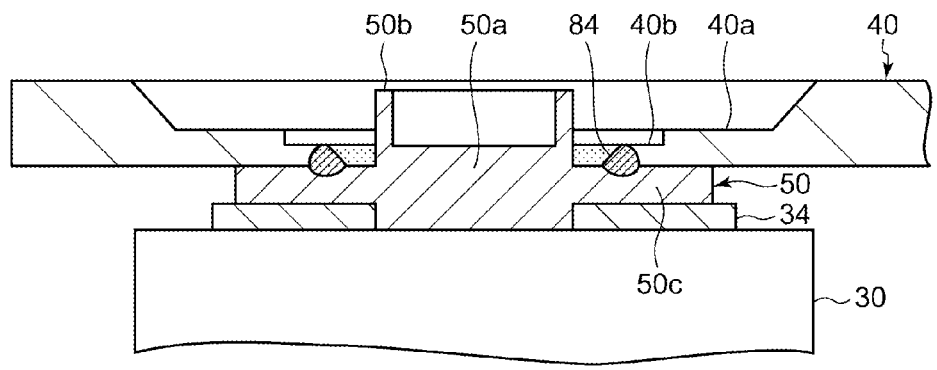

Next, description will be made with reference to FIGS. 10A through 10C regarding a cell connection method according to the embodiment 2. FIGS. 10A through 10C are cross-sectional process diagrams each showing a cell connection method according to the embodiment 2. It should be noted that FIGS. 10A through 10C each show the negative electrode terminal 50 as an example of the external terminal.

First, as shown in FIG. 10A, the bus bar 40 is prepared, which includes the main body portion 40a, and the intervening portion 40b having a thickness that is smaller than that of the main body portion 40a and that protrudes from the main body portion 40a. Furthermore, the cell 30 is prepared. Next, the bus bar 40 is mounted on the negative electrode terminal 50 after the negative electrode terminal 50 and the through hole 41 of the bus bar 40 are aligned.

Next, as shown in FIG. 10B, the laser L is emitted to the tip of the intervening portion 40b of the bus bar 40 so as to melt the tip of the intervening portion 40b and a part of the flange portion 50c, thereby welding the intervening portion 40b and the flange portion 50c. The laser L is emitted over the entire circumference of the exposed boundary between the intervening portion 40b and the flange portion 50c. It should be noted that the region to be irradiated by the laser L is not restricted to such a region.

By means of the aforementioned emission of the laser L, as shown in FIG. 10C, the welding portion 84 is formed so as to connect the remaining portion of the intervening portion 40b and the flange portion 50c, thereby connecting the bus bar 40 and the negative electrode terminal 50.

As described above, with the assembled battery 10 according to the present embodiment, the bus bar 40 has the intervening portion 40b having a thickness that is smaller than that of the main body portion 40a. With such an arrangement, the intervening portion 40b is welded to the external terminal. That is to say, a small-thickness portion that can easily be melted by laser emission is provided. The bus bar 40 and the external terminal are welded using this small-thickness portion. Thus, such an arrangement allows the power of the laser emitted in the welding to be reduced. This allows heat generated in the welding to be reduced. As a result, such an arrangement suppresses the propagation of heat generated in the welding to the cell main body via the external terminal.

With such an arrangement, the welding portion 84 is formed by melting the tip of the intervening portion 40b. Thus, such an arrangement provides an increased welding area as compared with an arrangement including no intervening portion 40b. This provides improved strength of the connection between the bus bar 40 and the external terminal. Furthermore, the bus bar 40 is configured such that one end of the intervening portion 40b is connected to the welding portion 84, and the other end of the intervening portion 40b is connected to the main body portion 40a. Thus, in a case in which force is applied so as to displace the lower face of the bus bar 40 from the upper face of the flange portion 50c of the negative electrode terminal 50, for example, the other end region of the intervening portion 40b plastically deforms. Thus, such an arrangement prevents stress from concentrating at the welding portion 84 even in such a case. Such an arrangement provides improved reliability of the connection between the bus bar 40 and the external terminal.

It should be noted that the aforementioned modifications 1 and 2 applied to the embodiment 1 can also be applied to the assembled battery 10 according to the embodiment 2, which provides the same advantage. That is to say, a tapered portion may be provided between the main body portion 40a of the bus bar 40 and the intervening portion 40b thereof. Also, the intervening portion 40b may be formed to have a thickness that gradually increases approaching the tip side from the main body portion 40a side.

The present invention is by no means intended to be restricted to the aforementioned embodiments. Also, various designs and so forth may be modified based on the knowledge of those skilled in this art, which are also encompassed within the scope of the present invention.

Figure 11:
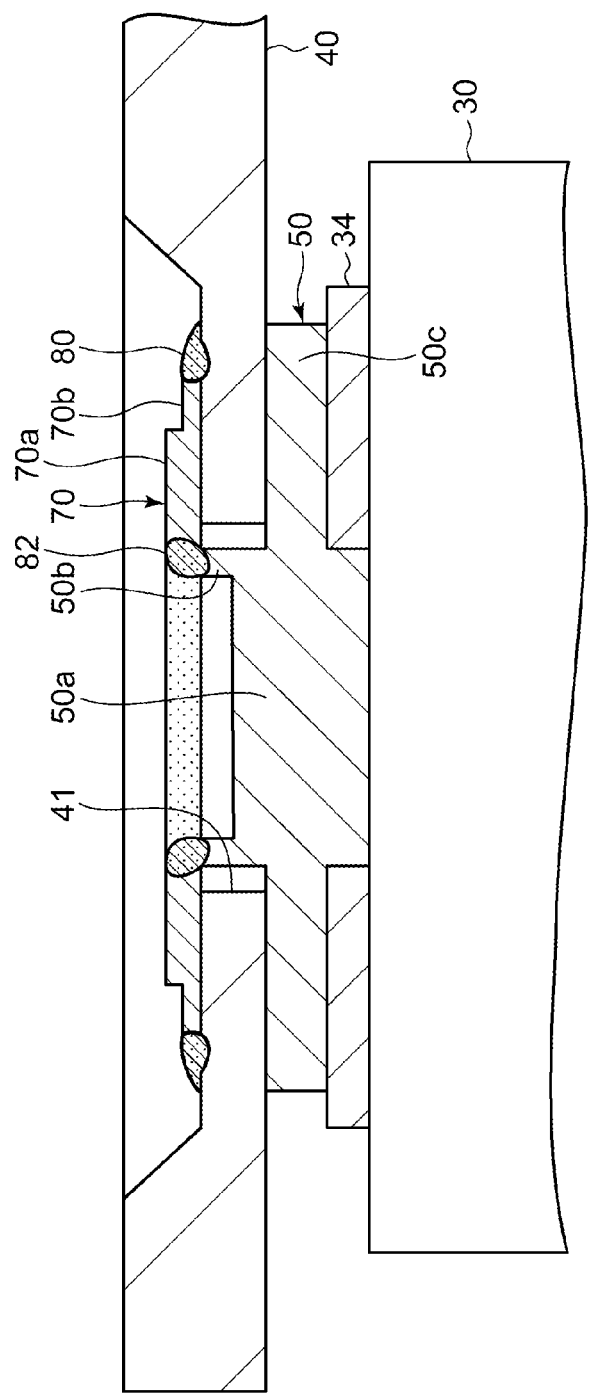
FIG. 11 is an enlarged cross-sectional diagram showing a schematic configuration in the vicinity of a connection portion that connects an external terminal and a bus bar included in an assembled battery according to a modification.

FIG. 11 is an enlarged cross-sectional diagram showing a schematic configuration in the vicinity of a connection portion that connects an external terminal and a bus bar included in an assembled battery according to a modification. As shown in FIG. 11, the upper face of the welding portion 82 and the upper face of the main body portion 70a of the connecting member 70 may be configured to have approximately the same level.

DESCRIPTION OF THE REFERENCE NUMERALS 10 assembled battery, 30 cell, 40 bus bar, 40a main body portion, 40b intervening portion, 50 positive electrode terminal, 50a main body portion, 50b intervening portion, 60 positive electrode terminal, 60a main body portion, 60b intervening portion, 70 connecting member, 70a main body portion, 70b intervening portion, 70c tapered portion, 80, 82, 84 welding portion.

INDUSTRIAL APPLICABILITY

Thus, the present invention is applicable to an assembled battery and a cell connection method.

The invention claimed is:
1. An assembled battery comprising:
a plurality of cells each including external terminals provided to a casing; and a terminal connection member configured to electrically connect the external terminal of one of two adjacent cells to the external terminal of the other of these adjacent cells, wherein the external terminal and the terminal connection member are connected to each other by means of welding, the terminal connection member comprises an intervening portion connected to a welding portion connected to the external terminal, and a main body portion extending from the intervening portion toward the external terminal side of the adjacent cell, the intervening portion is configured to have a thickness that is smaller than that of the main body portion and is in a direct contact with the external terminal, and the external terminal comprises an electrode terminal having a terminal main body portion protruding from the casing and a flange portion provided on an outer edge of the terminal main body portion, wherein the intervening portion is in a direct contact with the flange portion.

2. The assembled battery according to claim 1, wherein the terminal connection member has a through hole, the external terminal is arranged such that a part thereof is positioned within the through hole, and the terminal connection member and the external terminal are welded within the through hole.

3. The assembled battery according to claim 1, wherein a tapered portion is provided between the intervening portion and the main body portion such that its thickness gradually increases approaching the main body portion side from the intervening portion side.

4. The assembled battery according to claim 1, wherein the intervening portion has a tapered portion in a predetermined region extending from its end that is in contact with the welding portion connected to the terminal connection member, configured such that its thickness gradually reduces approaching the main body portion side from the aforementioned end of the intervening portion.

5. The assembled battery according to claim 1, wherein the terminal connection member has a first surface and a second surface which is opposite to the first surface and is in contact with the external terminal, the first surface has a step in which the intervening portion and the main body portion are connected.

6. The assembled battery according to claim 1, wherein the terminal connection member is band-shaped and has the intervening portion at each end of the terminal connection member, the external terminal of one of the two adjacent cells being welded to one end of the terminal connection member, and the external terminal of the other of the two adjacent cells being welded to the other end of the terminal connection member.

7. The assembled battery according to claim 1, wherein the intervening portion is in direct contact with the external terminal.

* * * * *